United States Patent
Kim et al.

(10) Patent No.: US 10,175,651 B2
(45) Date of Patent: Jan. 8, 2019

(54) METHOD AND APPARATUS FOR PROCESSING THREE-DIMENSIONAL IMAGE

(71) Applicant: SAMSUNG ELECTRONICS CO., LTD., Suwon-si (KR)

(72) Inventors: Yuntae Kim, Suwon-si (KR);
Geeyoung Sung, Daegu (KR);
Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 15/360,248

(22) Filed: Nov. 23, 2016

(65) Prior Publication Data

US 2018/0017938 A1    Jan. 18, 2018

(30) Foreign Application Priority Data

Jul. 13, 2016   (KR) .................. 10-2016-0088710

(51) Int. Cl.
*G06T 15/00*   (2011.01)
*G03H 1/04*   (2006.01)
(Continued)

(52) U.S. Cl.
CPC ......... *G03H 1/0443* (2013.01); *G03H 1/0808* (2013.01); *G09G 5/026* (2013.01);
(Continued)

(58) Field of Classification Search
None
See application file for complete search history.

(56) References Cited

U.S. PATENT DOCUMENTS

2009/0290203 A1\* 11/2009 Schwerdtner ........ G03H 1/0808
359/9
2010/0085276 A1    4/2010 Cable
(Continued)

FOREIGN PATENT DOCUMENTS

| JP | 2014-211565 A | 11/2014 |
|----|---------------|---------|
| KR | 10-1412050 B1 | 6/2014 |
| KR | 10-2014-0096532 A | 8/2014 |

OTHER PUBLICATIONS

Chen, et al., "Improved layer-based method for rapid hologram generation and real-time interactive holographic display applications", Jul. 2015, Optics Express, vol. 23, Issue 14, XP 055393081, 13 pages total.
(Continued)

*Primary Examiner* — Andrew G Yang
(74) *Attorney, Agent, or Firm* — Sughrue Mion, PLLC

(57) ABSTRACT

A method and apparatus for processing a three-dimensional image are provided. The method includes receiving original color data and original depth data of a plurality of layers of an original holographic image, selecting reference layers from among the plurality of layers, mapping adjustment color data of a non-selected layer, which is determined based on using the original depth data of the non-selected layer and the reference layers, to each of the reference layers, and generating a computer generated hologram image by using the original color data of the reference layers and the adjustment color data that has been mapped to the reference layers.

14 Claims, 11 Drawing Sheets

(51) Int. Cl.
*H04N 13/189* (2018.01)
*H04N 13/15* (2018.01)
*G09G 5/02* (2006.01)
*G03H 1/08* (2006.01)
G02B 27/22 (2018.01)
G09G 3/00 (2006.01)
G03H 1/02 (2006.01)

(52) U.S. Cl.
CPC ........... *H04N 13/15* (2018.05); *H04N 13/189* (2018.05); *G02B 27/2278* (2013.01); *G03H 2001/0224* (2013.01); *G03H 2210/13* (2013.01); *G03H 2210/30* (2013.01); *G03H 2210/33* (2013.01); *G03H 2210/441* (2013.01); *G03H 2210/454* (2013.01); *G03H 2225/60* (2013.01); *G06T 2200/04* (2013.01); *G06T 2207/10024* (2013.01); *G06T 2207/10028* (2013.01); *G06T 2207/20021* (2013.01); *G06T 2207/20056* (2013.01); *G06T 2207/20212* (2013.01); *G06T 2219/008* (2013.01); *G09G 3/003* (2013.01); *G09G 2300/023* (2013.01)

(56) References Cited

U.S. PATENT DOCUMENTS

| | | | |
|---|---|---|---|
| 2014/0146373 A1* | 5/2014 | Wey | G03H 1/0808 359/9 |
| 2014/0211286 A1 | 7/2014 | Nam et al. | |
| 2014/0307298 A1* | 10/2014 | Lee | G03H 1/0808 359/9 |
| 2015/0277378 A1* | 10/2015 | Smithwick | G03H 1/0808 359/9 |
| 2016/0041524 A1 | 2/2016 | Song et al. | |
| 2016/0266542 A1* | 9/2016 | Yamaichi | G03H 1/0005 |

OTHER PUBLICATIONS

Suyama, et al., "Apparent 3-D image perceived from luminance-modulated two 2-D images displayed at different depths", Apr. 2004, Vision Research, vol. 44, Issue 8, XP 055393084, pp. 785-793.

Communication dated Aug. 17, 2017, issued by the European Patent Office in counterpart European Patent Application No. 16204130.5.

* cited by examiner

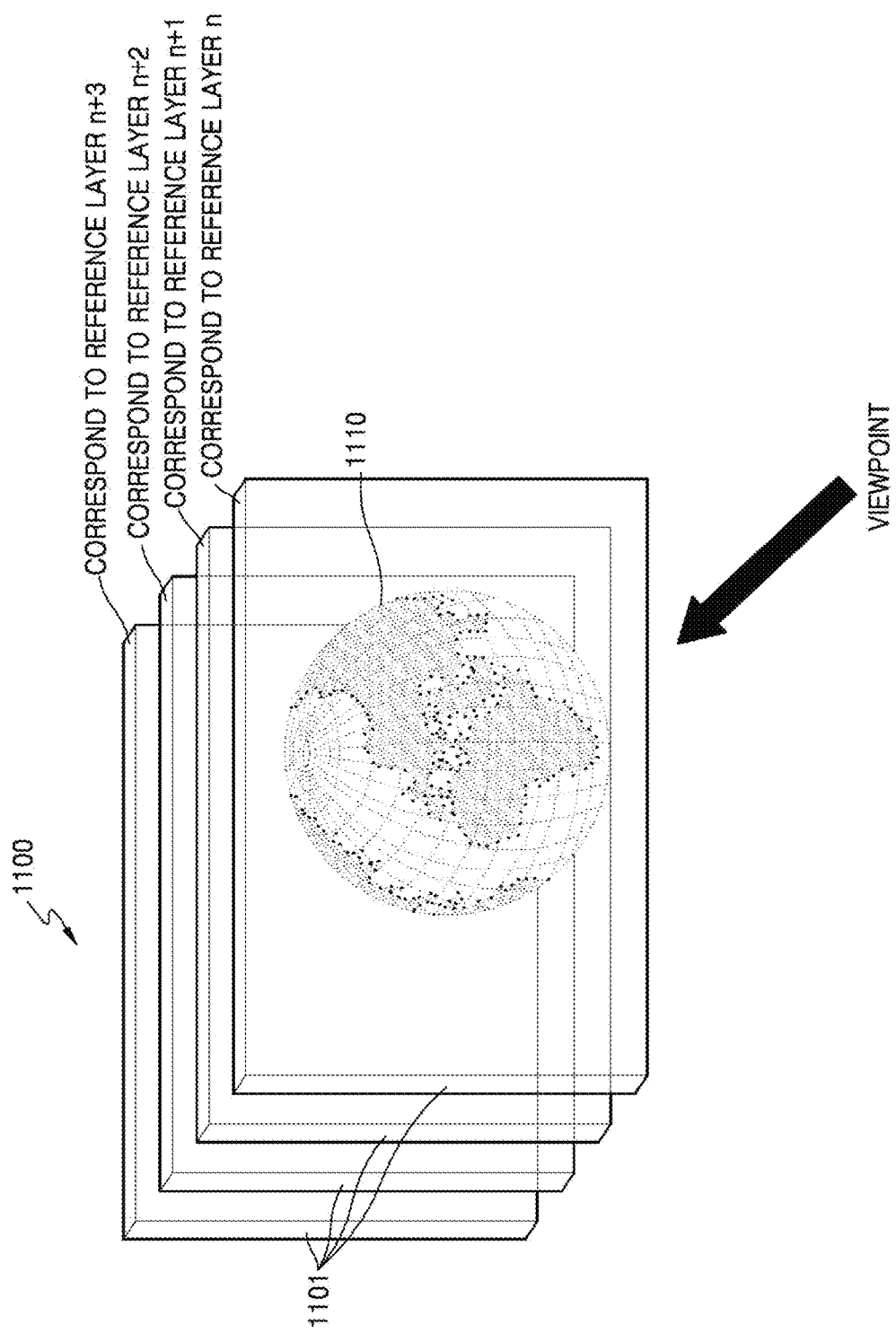

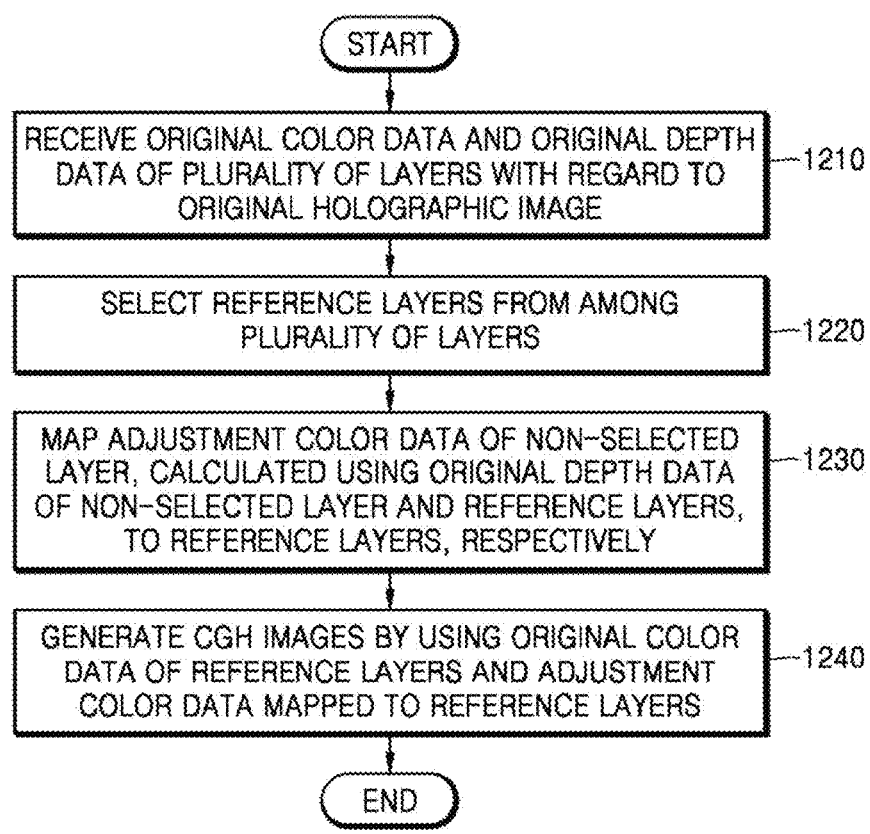

METHOD AND APPARATUS FOR PROCESSING THREE-DIMENSIONAL IMAGE

CROSS-REFERENCE TO RELATED APPLICATION

This application claims priority from Korean Patent Application No. 10-2016-0088710, filed on Jul. 13, 2016 in the Korean Intellectual Property Office, the disclosure of which is incorporated herein by reference in its entirety.

BACKGROUND

1. Field

Methods and apparatuses consistent with exemplary embodiments relate to processing a three-dimensional (3D) image, and more particularly, to processing a computer-generated hologram (CGH) image.

2. Description of the Related Art

With the development of 3D graphics technologies, many stereoscopic images for displaying 3D images have been generated. However, watching 3D movies using 3D images may give rise to various problems to users, such as rapid eye fatigue or restriction of a visual field. To overcome such problems, implementation of 3D images using holograms has recently attracted much attention. Holograms control the amplitude and the phase of light to render an object on a 3D space, almost without restriction of the visual field or eye fatigue. Thus, much study has been actively conducted on techniques for reproducing high-resolution holograms in real time based on generation of digital holograms such as a computer generated hologram (CGH).

SUMMARY

Exemplary embodiments provide a method and apparatus for processing 3D images. Additional aspects will be set forth in part in the description which follows and, in part, will be apparent from the description, or may be learned by practice of the presented exemplary embodiments.

According to an aspect of an exemplary embodiment, there is provided a method for processing a 3D image, the method including receiving original color data and original depth data of each of a plurality of layers with respect to an original holographic image, selecting at least one reference layer from among the plurality of layers, mapping adjustment color data of a non-selected layer, which is determined based on the original depth data of the non-selected layer and the at least one reference layer, to each of the at least one reference layer, and generating a computer generated hologram (CGH) image based on the original color data of the at least one reference layer and the mapped adjustment color data.

The mapping of the adjustment color data may include determining respective adjustment color values of pixels included in the non-selected layer in correspondence with each of the at least one reference layer based on a respective distance between the non-selected layer and each of the at least one reference layer, and mapping the determined adjustment color values of the pixels to each of the at least one reference layer.

The determining of the adjustment color values may include determining the respective adjustment color values by applying a respective weight value that corresponds to each respective distance to original color values of the pixels included in the non-selected layer.

Each respective weight value may be set in inverse proportion to a difference between a respective depth of a corresponding pixel of a non-selected layer and a depth of the at least one reference layer.

The selecting of the at least one reference layer may include selecting the at least one reference layer from among the plurality of layers such that a respective interval between adjacent ones of the at least one reference layer is an equal interval.

The selecting of the at least one reference layer may include selecting the at least one reference layers from among the plurality of layers such that a respective interval between adjacent ones of the at least one reference layer narrows as a corresponding distance of the at least one reference layer to a viewpoint of a user is reduced.

The mapping of the adjustment color data may include mapping the adjustment color data to each of the at least one reference layer.

The mapping of the adjustment color data may include mapping the adjustment color data to two reference layers that are adjacent to the non-selected layer.

The generating of the CGH image may include performing, for each of the at least one reference layer, a respective frequency transformation with respect to the original color data of the corresponding at least one reference layer and the adjustment color data mapped to the corresponding at least one reference layer, encoding respective results of each respective frequency transformation into respective integer values, and generating the CGH image based on the encoded integer values.

According to an aspect of another exemplary embodiment, there is provided a non-transitory computer-readable recording medium having recorded thereon a program for executing the method on a computer.

According to an aspect of another exemplary embodiment, there is provided an apparatus for processing a three-dimensional (3D) image, the apparatus including a memory configured to store original color data and original depth data of each of a plurality of layers with respect to an original holographic image and a processor configured to receive the original color data and the original depth data from the memory, to select at least one reference layer from among the plurality of layers, to map adjustment color data of a non-selected layer, which is determined based on the original depth data of the non-selected layer and the at least one reference layer, to each of the at least one reference layer, and to generate a computer generated hologram (CGH) image based on the original color data of the at least one reference layer and the mapped adjustment color data.

The processor may be further configured to determine respective adjustment color values of pixels included in the non-selected layer in correspondence with each of the at least one reference layer based on a respective distance between the non-selected layer and each of the at least one reference layer, and to map the determined adjustment color values of the pixels to each of the at least one reference layer.

The processor may be further configured to determine the respective adjustment color values by applying a respective weight value that corresponds to each respective distance to original color values of the pixels included in the non-selected layer.

Each respective weight value may be set in inverse proportion to a difference between a respective depth of a corresponding pixel of a non-selected layer and a depth of the at least one reference layer.

The processor may be further configured to select the at least one reference layer from among the plurality of layers such that a respective interval between adjacent ones of the at least one reference layer is an equal interval.

The processor may be further configured to select the at least one reference layer from among the plurality of layers such that a respective interval between adjacent ones of the at least one reference layer narrows as a corresponding distance of the at least one reference layer to a viewpoint of a user is reduced.

The processor may be further configured to map the adjustment color data to each of the at least one reference layer.

The processor may be further configured to map the adjustment color data to two reference layers that are adjacent to the non-selected layer.

The processor may be further configured to perform, for each of the at least one reference layer, a respective frequency transformation with respect to the original color data of the corresponding at least one reference layer and the adjustment color data mapped to the corresponding at least one reference layer, to encode results of each respective frequency transformation into respective integer values, and to generate the CGH image based on the encoded integer values.

The processor may be further configured to separately generate a multi-layer mapping image to be displayed on each of at least two panels for a display on which the at least two panels are stacked and images are formed at spatially different locations, and the multi-layer mapping image is generated based on the original color data of the at least one reference layer and the mapped adjustment color data.

BRIEF DESCRIPTION OF THE DRAWINGS

The above and/or other aspects will become apparent and more readily appreciated from the following description of exemplary embodiments, taken in conjunction with the accompanying drawings in which:

FIGS. 10 and 11 are views for describing display schemes of a CGH image, according to an exemplary embodiment; and FIG. 12 is a flowchart of a method for processing a 3D image, according to an exemplary embodiment.

DETAILED DESCRIPTION

Figure 1:
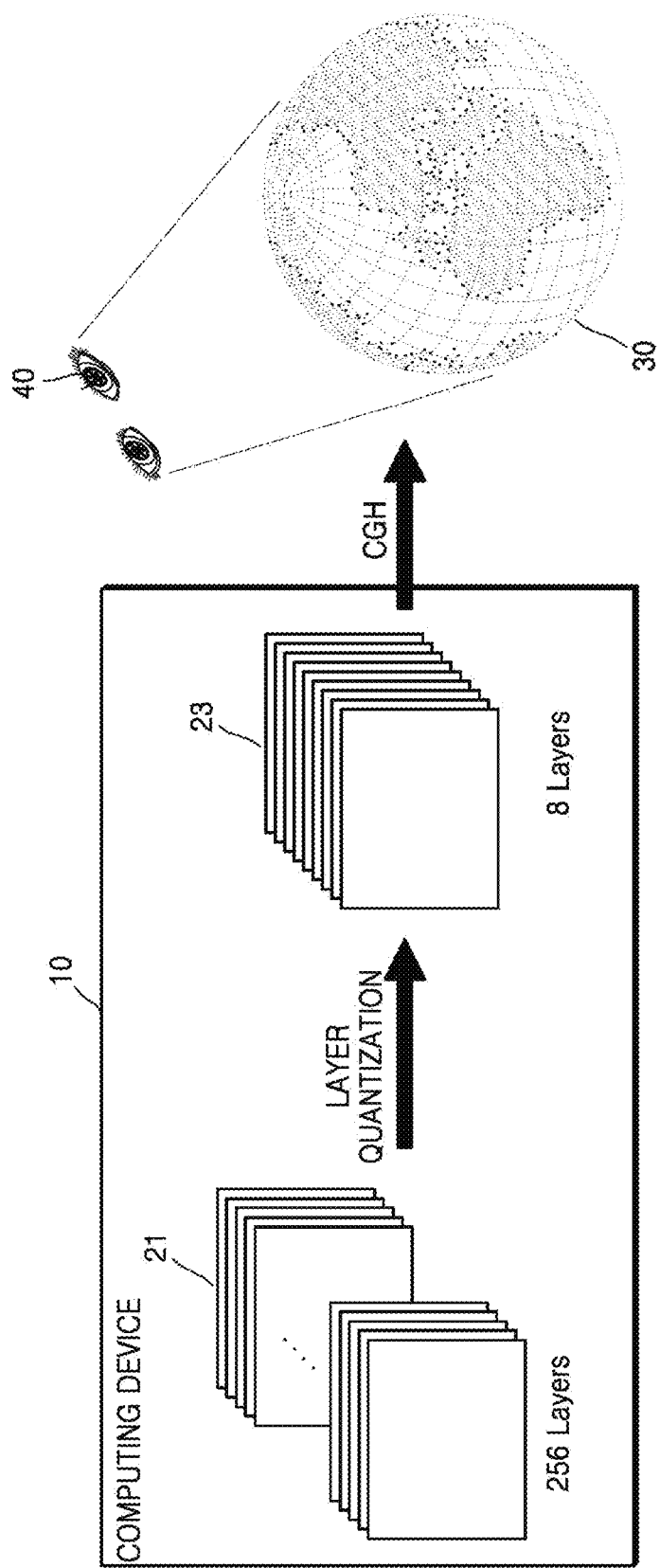
FIG. 1 is a view for describing displaying of a hologram image by using a computing device, according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Although terms used in the present disclosure are selected with general terms popularly used at present under the consideration of functions with respect to the exemplary embodiments, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the present disclosure. Thus, the terms used in the present disclosure should be defined not by the simple names of the terms but by the meaning of the terms and the contents throughout the present disclosure.

In a description of the exemplary embodiments, when a part is "connected" to another part, the part is not only directly connected to another part but may also be electrically connected to another part with another device intervening in between them. If it is assumed that a certain part includes a certain component, the term "including" means that a corresponding component may further include other components unless a specific meaning opposed to the corresponding component is written. The term used in the exemplary embodiments such as "unit" or "module" indicates a unit for processing at least one function or operation, and may be implemented in hardware, software, or in a combination of hardware and software.

The term such as "comprise" or "include" as used with respect to the exemplary embodiments should not be interpreted as including all of elements or operations described herein, and should be interpreted as excluding some of the elements or operations or as further including additional elements or operations.

The following description of the exemplary embodiments should not be construed as limiting the scope of the exemplary embodiments, and what may be easily deduced by those of ordinary skill in the art should be construed as falling within the scope of the exemplary embodiments. Hereinafter, the exemplary embodiments for illustration will be described in detail with reference to the accompanying drawings.

FIG. 1 is a view for describing displaying of a hologram image by using a computing device, according to an exemplary embodiment.

Referring to FIG. 1, a computing device 10 generates a computer generated hologram (CGH) image 30 by performing CGH processing with respect to an original holographic image that has been input from an external source or stored in the computing device 10, and displays the generated CGH image 30 to enable a user 40 to see the generated CGH image 30 on a virtual 3D space. Herein, CGH processing may be defined as including a series of processes until the CHG image 30 is generated by the computing device 10. The CGH image 30 may include a still image, or a moving image played as a hologram. That is, the CGH image 30 may include a plane (two-dimensional: 2D) hologram, a volume (three-dimensional: 3D) hologram, and so forth.

The hologram is a type of a 3D space expression technique by which an amplitude and a phase of light are adjusted so as to reproduce an object on a 3D space without restriction of a visual field and cubic fatigue. Hence, many devices for implementing high-resolution holograms in real time by using a complex spatial modulator (SLM) capable of controlling amplitude and phase of light at the same time have been developed. The hologram may be displayed on a 3D space by using an interference pattern between an object wave and a reference wave. Recently, a CGH technique for providing a hologram on a flat panel display by processing an interference pattern for playing a hologram moving image has been used.

A digital hologram generation method, e.g., a CGH technique generates a hologram by approximating optical signals and calculating an interference pattern generated using mathmatical operations. The digital hologram generation method calculates a point hologram that corresponds to each of all 3D points of a 3D object based on a feature that the 3D object includes a set of the 3D points, thereby expressing a completed hologram.

Generation of the CGH image 30 from the original holographic image may be performed by the CGH processing including various operations. In particular, the CGH processing may include performance of a fast Fourier transform (FFT) for obtaining each hologram point on the 3D space. A factor having the greatest influence upon a computation amount or speed for the CGH processing may be, for example, the FFT operation. In the CGH processing, an FFT must be performed on every pixel of each layer. Thus, as the number of layers included in the original holographic image increases, FFT is inevitably repeated a number of times, thereby increasing the computation amount for the CGH processing and lowering the computation speed for the CGH processing. Hence, if FFT may be efficiently performed for layers, the CGH processing may be completed at a relatively high speed.

The computing device 10 performs layer quantization by selecting some of a plurality of layers 21 (e.g., 256 8-bit layers) included in the original holographic image. The selected layers correspond to reference layers 23 (e.g., 8 layers).

If color data and depth data for each of the reference layers 23 is used to generate the CGH image 30 and color data and depth data for non-selected layers that are not selected as the reference layers 23 from among the plurality of layers 21 is not used to generate the CGH image 30, the computation amount of the CGH processing may be reduced and the computation speed of the CGH processing may be raised, thus resulting in a degradation of the display quality of the CGH image 30.

The computing device 10 performs the CGH processing by using the reference layers 23 to reduce the computation amount of the CGH processing and increase the computation sped of the CGH processing while maintaining the display quality of the original holographic image, and at the same time, takes color data and depth data for the non-selected layers into account in order to perform the CGH processing.

Figure 2:
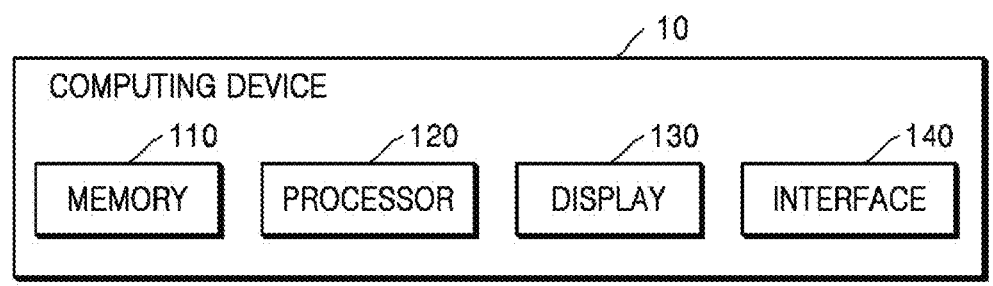
FIG. 2 is a block diagram of a hardware configuration of a computing device, according to an exemplary embodiment.

FIG. 2 is a block diagram of a hardware configuration of a computing device, according to an exemplary embodiment.

Referring to FIG. 2, the computing device 10, which is a device that is configured for processing a 3D image (e.g., a holographic image, etc.), may include a memory 110, a processor 120, a display 130, and an interface 140. The computing device 10 illustrated in FIG. 2 is illustrated as including elements associated with exemplary embodiments. Thus, it will be understood by those of ordinary skill in the art that general-purpose elements other than the elements illustrated in FIG. 2 may also be included in the computing device 10.

The computing device 10 may be, but not limited to, a desktop computer, a laptop computer, a smartphone, a personal digital assistant (PDA), a portable media player, a video game console, a television (TV) set-top box, a tablet device, an electronic (e)-book reader, a wearable device, and so forth. In this aspect, the category of the computing device 10 may include any of various devices.

The processor 120 is a hardware component that controls overall operations and functions of the computing device 10. For example, the processor 120 may drive an operating system (OS), call a graphics application programming interface (API) for CGH processing, and execute a graphics driver. The processor 120 may execute any of various applications, e.g., a hologram play application, a web-browsing application, a game application, a video application, and so forth.

The processor 120 performs overall CGH processing for selecting the reference layers 23 from among the plurality of layers 21 and generating the CGH image 30 by using the selected reference layers 23. The processor 120 may be implemented with any of various types, such as a central processing unit (CPU), a graphic processing unit (GPU), an application processor (AP), and the like.

The memory 110 is a hardware component which is configured for storing various data processed in the computing device 10, and the memory 110 stores data processed or to be processed by the processor 120 or data received via the interface 140. For example, the memory 110 may store data that relates to the original holographic image, e.g., color data and depth data of the plurality of layers 21 included in the original pholographic image. The memory 110 stores data mapped to the reference layers 23 for the CGH processing of the processor 120, and stores GFT operation results (especially, FFT operation results) calculated by the CGH processing.

The memory 110 may include any of random access memory (RAM) such as dynamic random access memory (DRAM), static random access memory (SRAM), etc., read-only memory (ROM), electrically erasable programmable read-only memory (EEPROM), compact disk (CD)-ROM, Blu-ray or other optical disk storages, hard disk drive (HDD), solid state drive (SSD), or flash memory, and may also include other external storage devices that are accessible by the computing device 10.

The display 130 is a hardware component which is capable of displaying the CGH image 30 on the 3D space. The display 130 may include a module for holograms such as SLM, and may include any of various types of display panels, such as a liquid crystal display (LCD), an organic light-emitting diode (OLED) display, etc. The display 130 may have a structure in which two or more focal planes are located in different positions that are spatially separated. In other words, the display 130 may be a multi-focal plane display in which two or more transparent displays are stacked. That is, the display 130 may include various modules and components for displaying the CGH image 30.

The interface 140 may be implemented as a hardware component of a wired/wireless network interface for communication of the computing device 10 with other external devices. The interface 140 receives, from an external server, e.g., another device, the original holographic image which is to be converted into the CGH image 30. The interface 140 transmits data that relates to the CGH image 30 to an external server or another device such that the CGH image 30 is displayable or reproducible on other devices.

Figure 3:
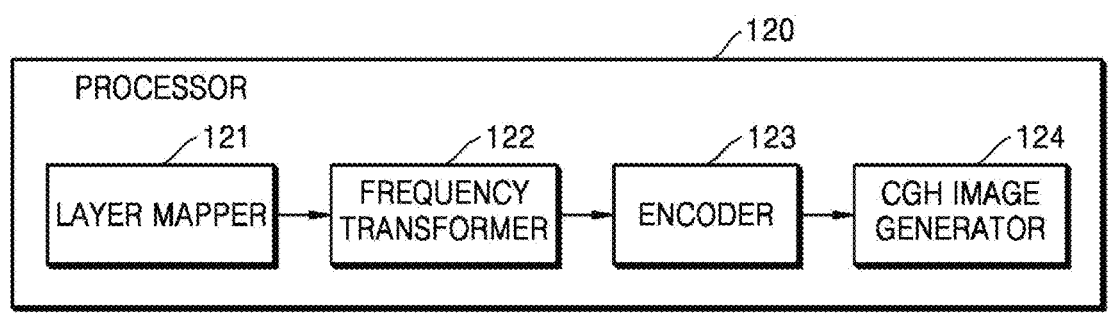
FIG. 3 is a block diagram of a detailed hardware configuration of a processor, according to an exemplary embodiment.

FIG. 3 is a block diagram of a detailed hardware configuration of a processor, according to an exemplary embodiment.

Referring to FIG. 3, the processor 120 may include a layer mapper 121, a frequency transformer 122, an encoder 123, and a CGH image generator 124. The processor 120 illustrated in FIG. 3 is illustrated as including only elements associated with exemplary embodiments to prevent characteristics of the exemplary embodiments from being obscured, and thus the processor 120 may further include general-purpose elements other than the elements illustrated in FIG. 3. The layer mapper 121, the frequency transformer 122, the encoder 123, and the CGH image generator 124 are separated by separate independent names based on functions thereof, and may be implemented with at least one processor 120. Each of the layer mapper 121, the frequency transformer 122, the encoder 123, and the CGH image generator 124 may correspond to one or more processing modules (or sub-processors) included in the processor 120. The layer mapper 121, the frequency transformer 122, the encoder 123, and the CGH image generator 124 may correspond to separate software algorithm units which are separated based on their functions. That is, in the processor 20, implementation forms of the layer mapper 121, the frequency transformer 122, the encoder 123, and the CGH image generator 124 are not limited to a specific form.

The layer mapper 121 receives original color data and original depth data of a plurality of layers of the original holographic image. For example, the original holographic image may include 8 bits, i.e., 256 layers. To each layer, corresponding original color data and original depth data are mapped.

The layer mapper 121 selects one or more reference layers from among a plurality of layers of the input original holographic image. The number of reference layers may be less than a total number of layers included in the original holographic image. The number of reference layers may change arbitrarily and may not be fixed.

The layer mapper 121 may select the reference layers from among the plurality of layers such that the reference layers have an equal interval therebetween. The layer mapper 121 may select the reference layers from among the plurality of layers such that the reference layers have a narrowing interval therebetween as the reference layers become closer to the viewpoint of the user. For example, if the number of layers included in the original holographic image is 256, the layer mapper 121 may select every 32nd layers to select a total of 8 reference layers, without being limited to this example.

The layer mapper 121 maps adjustment color data of non-selected layers which is calculated by using original depth data of the non-selected layers and the reference layers to the reference layers, respectively.

More specifically, the layer mapper 121 determines adjustment color values of pixels included in the non-selected layers in correspondence with the reference layers based on respective distances between the non-selected layers and the reference layers. The layer mapper 121 applies respective weight values that correspond to the distances to the original color values of the pixels included in the non-selected layers, thereby determining adjustment color values to be mapped to the reference layers. The distance is a relative value which is a distance between a depth of a pixel of a non-selected layer and a depth of a reference layer. Each respective weight value is set in inverse proportion to a corresponding difference between a depth of a pixel of a non-selected layer and a depth of a reference layer.

The layer mapper 121 maps the determined adjustment color values of the pixels to the reference layers, respectively. As such, the processor 120 overlaps data of the non-selected layers to data of the reference layers, instead of performing the CGH processing only based on the reference layers, thus improving the display quality of the CGH image to a level that is relatively close to a display quality of the original holographic image.

As a mapping scheme, the layer mapper 121 may map the adjustment color data to each of the reference layers, or to two reference layers which are adjacent to a non-selected layer. That is, the mapping scheme of the layer mapper 121 is not particularly limited to a specific scheme.

For each reference layer, the frequency transformer 122 performs a respective frequency transformation with respect to original color data of the reference layer and adjustment color data mapped to the reference layer. As a result of the frequency transformation, the frequency transformer 122 obtains complex values corresponding to the respective reference layers. Thus, a complex value corresponding to a frequency transformation result reflects characteristics of original color data of each reference layer and characteristics of adjustment color data mapped to the reference layer. The frequency transformer 122 transmits a complex value corresponding to each reference layer to the memory 110, and the memory 110 stores a complex value for each reference layer.

The frequency transformer 122 performs a generalized Fresnel transform (GFT) by using coordinate data ((x,y) data), RGB color data, or depth data (z-axis coordinate data) that relates to pixels included in a reference layer and adjustment coordinate data ((x,y) data), adjustment RGB color data, or adjustment depth data that relates to pixels mapped to the reference layer. The GFT or Fresnel transform is an operation for obtaining a distribution of a diffracted image obtained by Fresnel diffraction of an image and is well-known to those of ordinary skill in the art.

When GFT is performed, the frequency transformer 122 performs an FFT on pixels included in a reference layer and pixels mapped to the reference layer and as a result, obtains a respective complex value that corresponds to each pixel. A complex value corresponding to each pixel may include information about an amplitude and a phase on a Fresnel diffraction pattern.

As stated above, the greatest computational load of the CGH processing arises due to computations associated with the FFT. In the CGH processing, an FFT is performed for every pixel of each layer, such that as the number of layers increases, the computation amount may increase and the calculation speed may be reduced. The processor 120 according to the current exemplary embodiment performs an FFT with respect to some layers, i.e., reference layers, instead of all the layers included in the input original holographic image, thereby more efficiently performing CGH processing. Moreover, data of non-selected layers as well as data of layers selected as reference layers are mapped to the reference layers, thereby reducing the display quality artifact of the CGH image.

The encoder 123 encodes frequency transformation results (i.e., complex values) that correspond to the respective reference layers into integer values. The encoder 123 encodes the complex values into 8-bit unsigned integer values. For example, the encoder 123 may encode "0 . . . 1" for a pixel (x1, y1), "00 . . . 1 . . . 1" for a pixel (x2, y1), "11 00" for a pixel (x3, y1), and 8-bit unsigned integers for the other pixels. The 8-bit unsigned integers that correspond to respective pixels are values that correspond to respective pixels of the CGH image (30 of FIG. 1), and may be a value that corresponds to each hologram point of the CGH image 30.

The CGH image generator 124 generates the CGH image by using the encoded integer values. In this way, as the processor 120 performs the CGH processing, the original holographic image may be converted into the CGH image (30 of FIG. 1). Herein, by controlling phase values for each pixel according to complex SLM and transmittance for each pixel according to amplitude SLM, based on complex values, the CGH image may be output. Thus, encoded integer values may be used to control complex SLM and amplitude SLM for outputting the CGH image.

Figure 4:
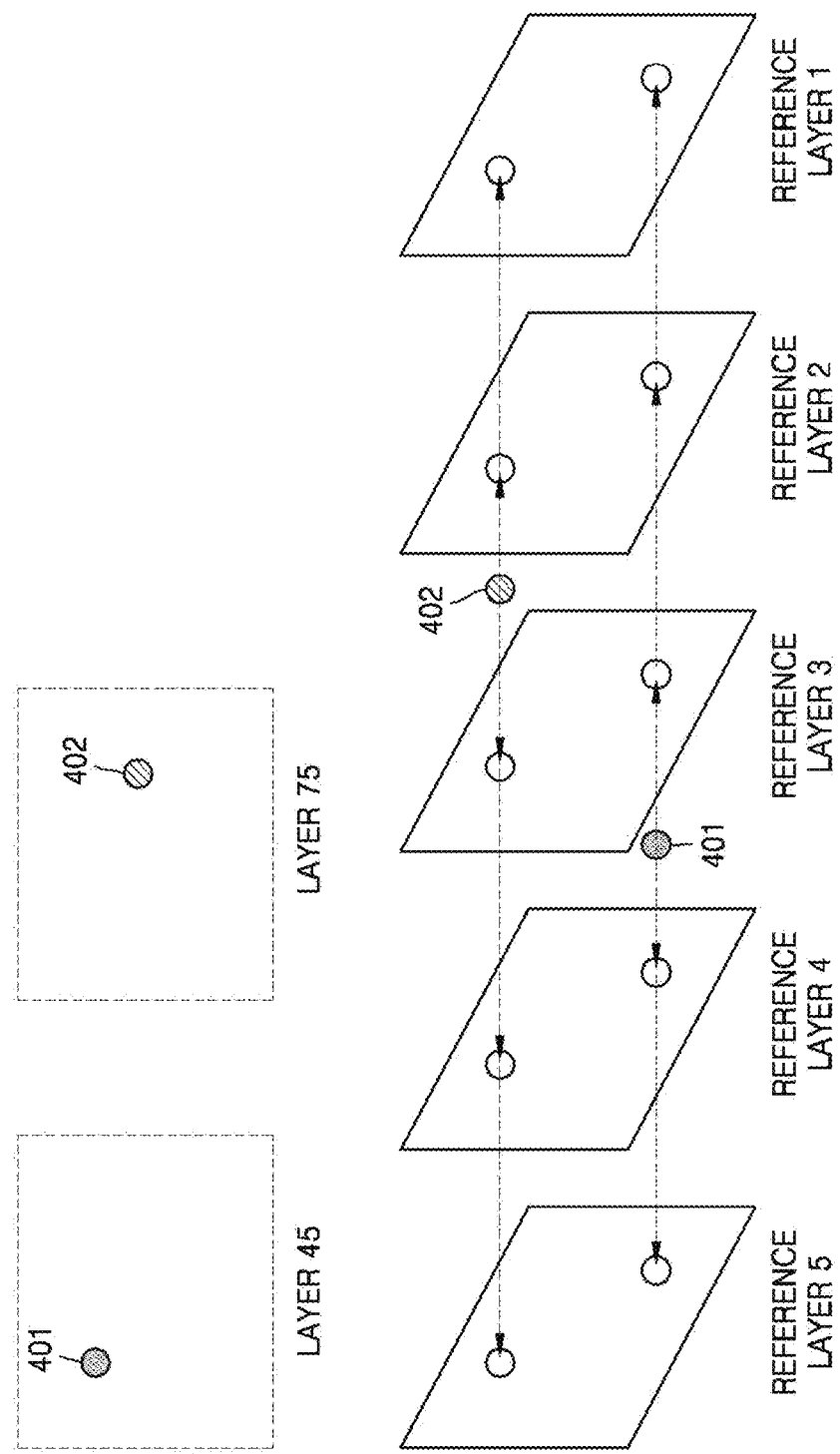
FIG. 4 is a view for describing mapping of pixels of a non-selected layer to reference layers, according to an exemplary embodiment.

FIG. 4 is a view for describing mapping of pixels of a non-selected layer to reference layers, according to an exemplary embodiment.

Referring to FIG. 4, the following description assumes that the original holographic image includes a total of 256 layers and 8 reference layers are selected at equal intervals from among all reference layers. Thus, a reference layer 1 corresponds to an original layer 0, a reference layer 2 corresponds to an original layer 32, a reference layer 3 corresponds to an original layer 64, a reference layer 4 corresponds to an original layer 96, and a reference layer 5 corresponds to an original layer 128.

A layer 45 is not selected as a reference layer, such that color data of pixels of the layer 45 is mapped to each of the 8 reference layers. The layer 45 is closer to the reference layer 3 than to the reference layer 1, such that a difference (i.e., a distance) between a depth of a pixel 401 of the layer 45 and a depth of the reference layer 1 is greater than a difference (i.e., a distance) between the depth of the pixel 401 and a depth of the reference layer 3. Thus, a greater portion of the color data of the pixel 401 of the layer 45 shall be mapped to the reference layer 3 than to the reference layer 1.

A layer 75 is not selected as a reference layer, such that color data of pixels of the layer 75 is mapped to each of the 8 reference layers. The layer 75 is closer to the reference layer 3 than to the reference layer 5, such that a difference (i.e., a distance) between a depth of a pixel 402 of the layer 75 and a depth of the reference layer 5 is greater than a difference (i.e., a distance) between the depth of the pixel 402 and a depth of the reference layer 3. Thus, a greater portion of the color data of the pixel 402 of the layer 75 shall be mapped to the reference layer 3 than to the reference layer 5.

In this manner, a respective weight value is applied to color data of each pixel of a non-selected layer based on a distance between the non-selected layer and reference layers, such that adjustment color data of pixels of the non-selected layer is determined and the determined adjustment color data is mapped to each of the reference layers.

Figure 5:
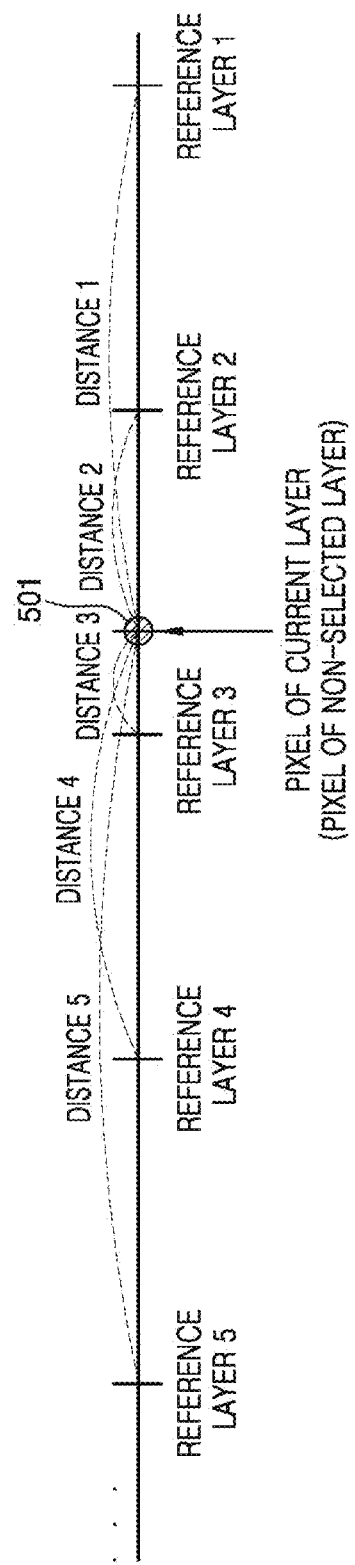
FIG. 5 is a view for describing a weight value for determining adjustment color data, according to an exemplary embodiment.

FIG. 5 is a view for describing a weight value for determining adjustment color data, according to an exemplary embodiment.

As stated above, each respective weight value may be set in inverse proportion to a corresponding difference between a depth of a pixel included in a non-selected layer and a depth of a reference layer.

Referring to FIG. 5, a difference between a depth of a pixel 501 of a current layer (i.e., a pixel of a non-selected layer) and a depth of each reference layer is calculated. In current exemplary embodiments, the difference will be defined as a term "distance". A distance 1, a distance 2, a distance 3, a distance 4, and a distance 5 means a difference between a depth of a pixel 501 of a current layer (a pixel of a non-selected layer) and a depth of each reference layer (each of reference layers 1 through 5). A weight value based on a distance may be set as expressed in Equation (1) below.

$$\text{wgt\_layer}(i, j, k) = \alpha \cdot \left(1 - \frac{|depth_{in}(i, j) - \text{layer\_depth}(k)|}{\text{Max\_distance}}\right)^n \quad (1)$$

Equation (1) is used to calculate a weight value in each non-selected layer. Referring to Equation (1), $depth_{in}(i,j)$ indicates a depth value at a position (i,j) and layer_depth(k) indicates a depth value of a $k^{th}$ reference layer. Hence, in Equation (1), $|depth_{in}(i,j)-\text{layer\_depth}(k)|$ may indicate a distance. Further, α indicates a constant value, n indicates an index, and Max_distance indicates a maximum value among a depth value of a pixel of a non-selected layer and a depth value of a reference layer as defined in Equation (2), which is expressed below.

$$\text{Max\_distance} = \text{Max}(|depth_{in}(i,j) - \text{layer\_depth}(k)|) \quad (2)$$

Referring to Equation (3) as expressed below, by summing weight values of pixels of a non-selected layer, sum_wgt_layer(i,j) may be calculated.

$$\text{sum\_wgt\_layer}(i, j) = \sum_{k=1}^{N} \text{wgt\_layer}(i, j, k), \quad (3)$$

In Equation (3), k indicates an index value of a reference layer and N indicates the number of all layers included in an original holographic image. According to Equations (1), (2), and (3), a weight value for an adjustment color value is normalized.

An adjustment color value of pixels included in a non-selected layer to be mapped to a reference layer may be calculated using Equation (4) as expressed below.

$$\text{color\_layer}(i, j, k) = color_{in}(i, j) \times \frac{\text{wgt\_layer}(i, j, k)}{\text{sum\_wgt\_layer}(i, j)}, \quad (4)$$

In Equation (4), $color_{in}(i,j)$ signifies an original color value at a position (i,j).

The above-described processor 120 of FIG. 2 (i.e., the layer mapper 121 of FIG. 3) maps adjustment color values determined for pixels of a non-selected layer to respective reference layers by using Equations (1), (2), (3), and (4).

Figure 6:
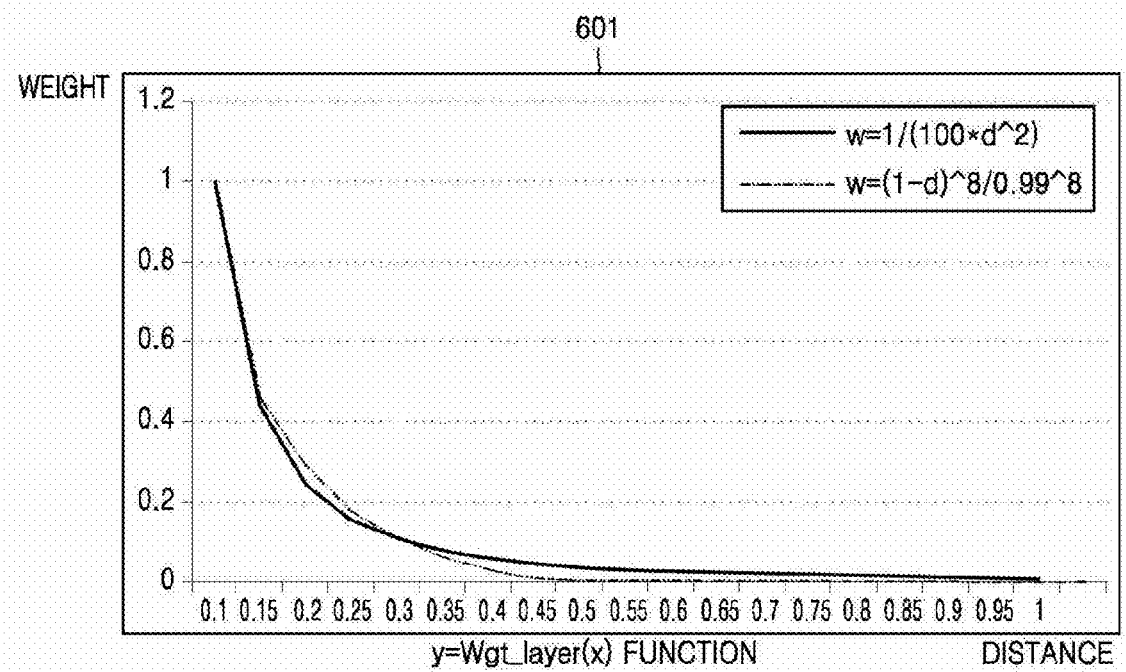
FIG. 6 is a view for describing an inverse proportional relationship between a distance and a weight value, according to an exemplary embodiment.

FIG. 6 is a view for describing an inverse proportional relationship between a distance and a weight value, according to an exemplary embodiment.

A graph 601 shown in FIG. 6 shows a simulation result when α of Equation (1) is equal to 1/0.99^8 and n is set to 8. Referring to FIG. 6, as a distance increases, a weight value for an adjustment color value decreases, and as the distance decreases, the weight value for the adjustment color value increases. This is because, as described above with reference to FIG. 4, a greater portion of color data of pixels of a non-selected layer is mapped to a closer reference layer, and a lesser portion of the color data is mapped to a more distant reference layer.

Figure 7:
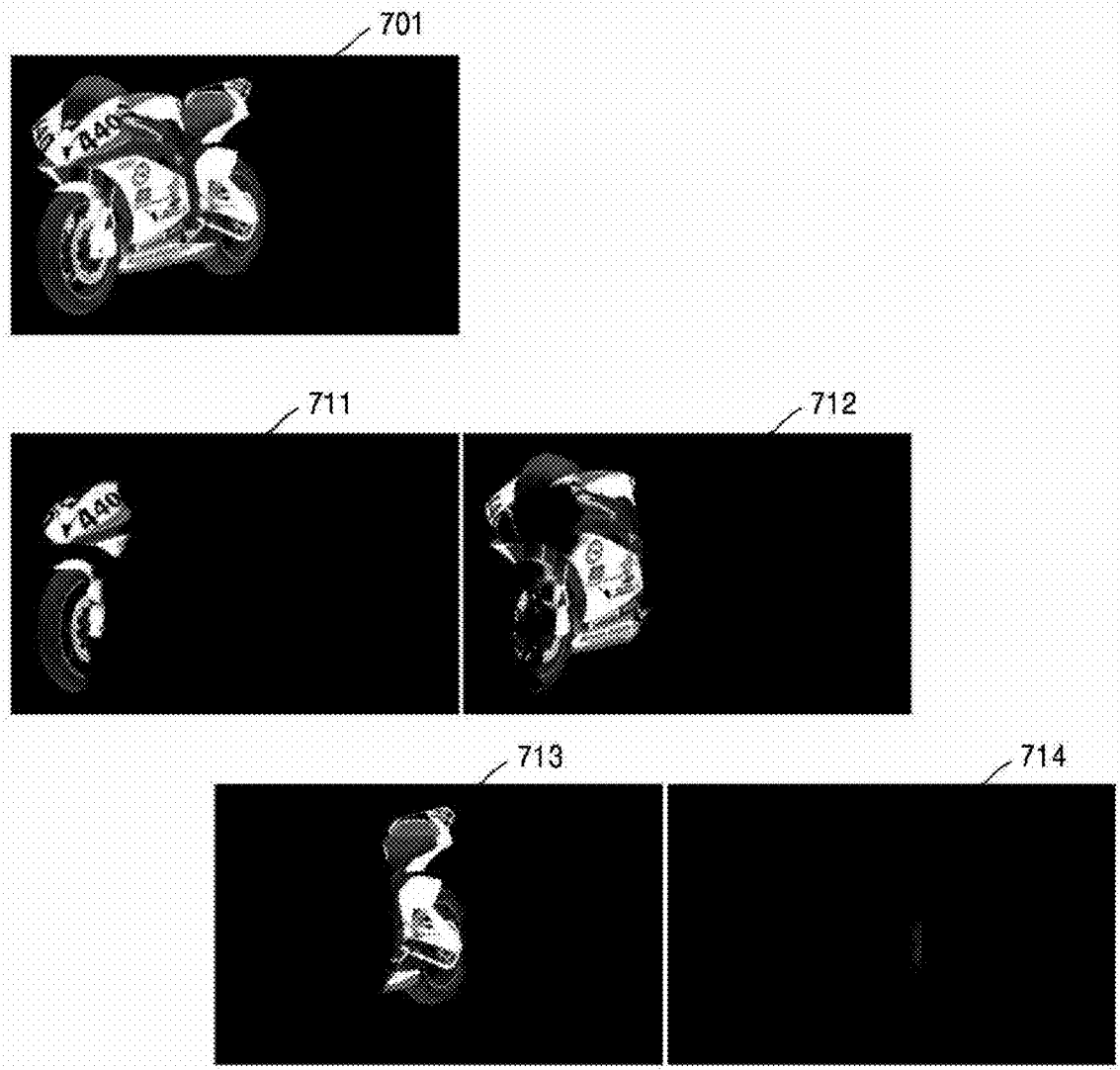
FIGS. 7 and 8 are views for comparing a case where non-selected layers are mapped to reference layers (i.e., multi-layer mapping) with a case where the multi-layer mapping is not performed, according to an exemplary embodiment.
Figure 8:
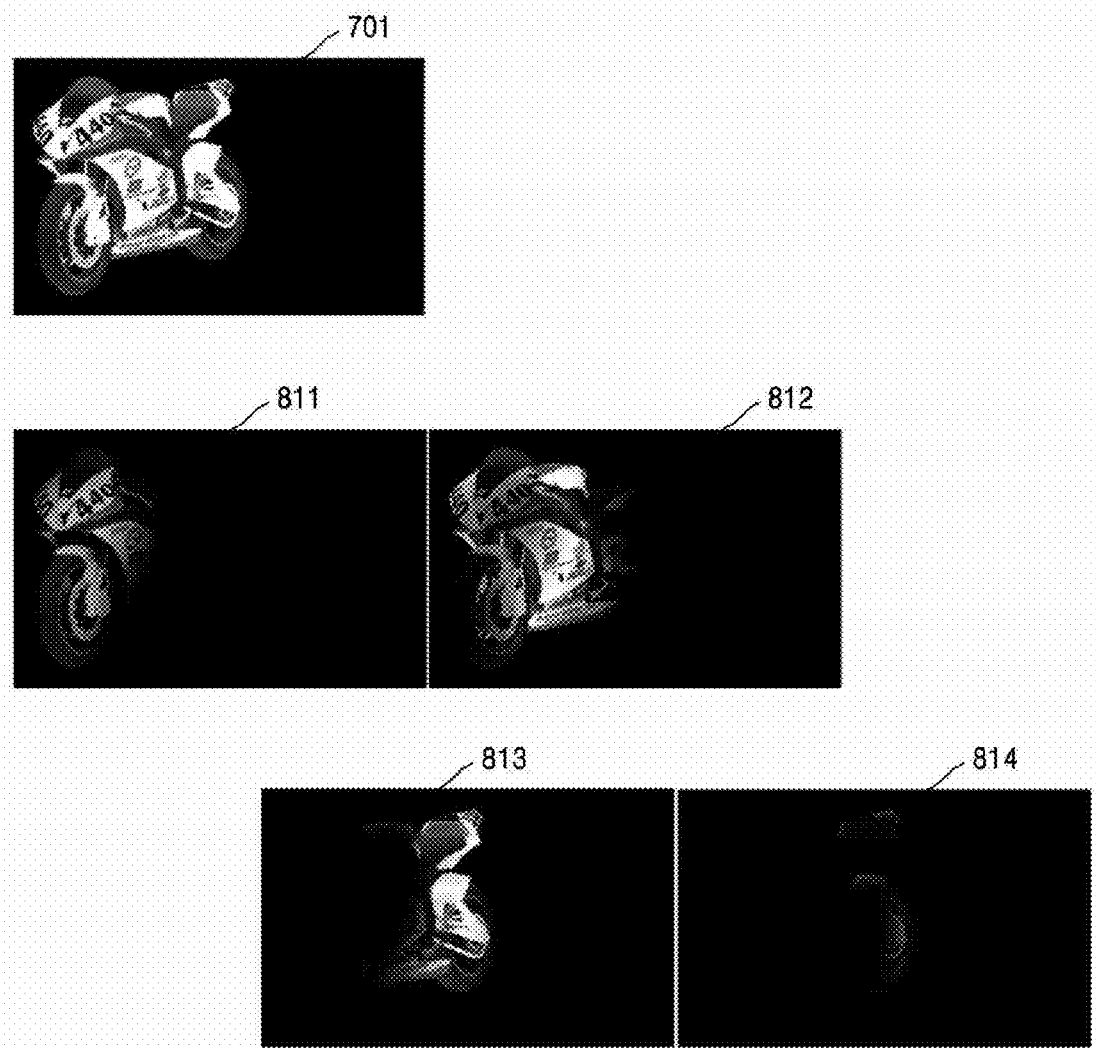

FIGS. 7 and 8 are views for comparing a case where non-selected layers are mapped to reference layers (i.e., multi-layer mapping) with a case where the multi-layer mapping is not performed, according to an exemplary embodiment.

In FIG. 7 are illustrated layer color images 711, 712, 713, and 714 when a color value of a pixel is mapped only to one reference layer that is closest to the non-selected layer as a case where multi-layer mapping according to the current exemplary embodiment is not performed. In FIG. 7, in the respective layer color images 711, 712, 713, and 714 corresponding to reference layers selected from among layers included in an original holographic image 701, a region where a color value exists and a region where a color value does not exist vary greatly according to a depth value in a corresponding reference layer.

However, referring to FIG. 8, where multi-layer mapping according to the current exemplary embodiment is performed, in respective layer color images 811, 812, 813, and 814 corresponding to reference layers selected from among layers included in the original holographic image 701, a region where a color value exists and a region where a color value does not exist vary gradually or gently according to a depth value in a corresponding reference layer. In this aspect, respective differences between the layer color images 711, 712, 713, and 714 and the layer color images 811, 812, 813, and 814 occur based on whether color data of pixels included in non-selected layers are uniformly mapped to reference layers. Thus, by using a multi-layer mapping scheme according to the current exemplary embodiment, a high-quality CGH image may be generated.

Figure 9:
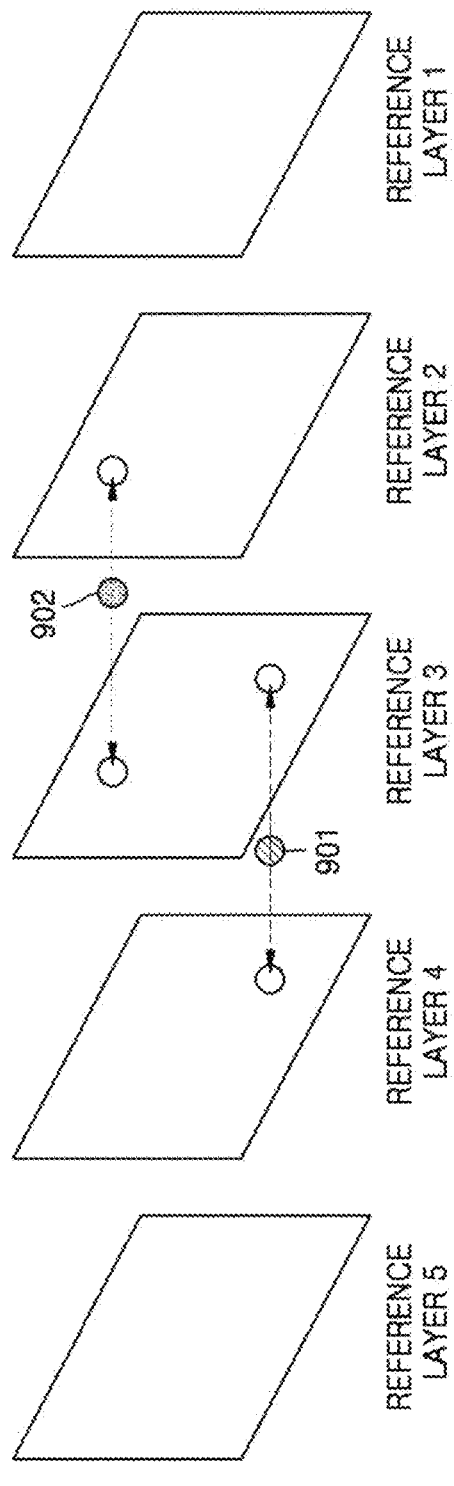
FIG. 9 is a view for describing mapping of pixels of a non-selected layer to reference layers, according to another exemplary embodiment.

FIG. 9 is a view for describing mapping of pixels of a non-selected layer to reference layers, according to another exemplary embodiment.

Referring to FIG. 9, unlike the mapping scheme described with reference to FIG. 4, adjustment color data of a pixel included in a non-selected layer may be mapped to two reference layers that are adjacent to the non-selected layer. Although adjustment color data is mapped to all reference layers in FIG. 4, adjustment color data may be mapped to two reference layers that are adjacent to the non-selected layer without being limited to this example. For example, a pixel 901 of a non-selected layer may be mapped to the reference layer 3 and the reference layer 4 which are the most adjacent two reference layers, and a pixel 902 of another non-selected layer may be mapped to the reference layer 2 and the reference layer 3 which are the most adjacent two reference layers. A way to apply a weight value based on a distance between the pixels 901 and 902 and the reference layers may be based on Equations (1), (2), (3), and (4). In this aspect, the current exemplary embodiment is not limited to this example, and the number of reference layers to which a pixel of a non-selected layer is to be mapped may vary.

Figure 10:
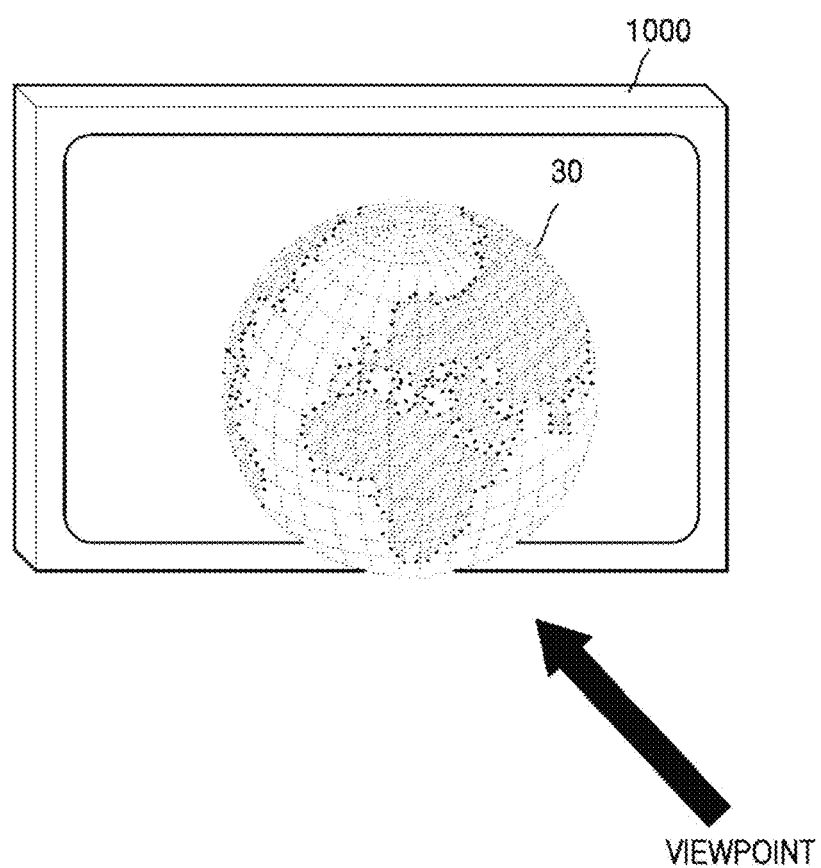

FIGS. 10 and 11 are views for describing display schemes of a CGH image, according to an exemplary embodiment.

Referring to FIG. 10, the CGH image 30 generated by a processor (e.g., processor 120 of FIG. 2) may be displayed on a display device 1000 implemented with a single flat panel. The display device 1000 displays the CGH image 30 by controlling phase values for each pixel according to complex SLM and a transmittance for each pixel according to amplitude SLM based on integer values encoded from complex values.

Unlike the display 1000 of FIG. 10, a display device 1100 of FIG. 11 may have a structure in which two or more focal plane panels 1101 are located in different positions that are spatially separated. In this aspect, the display 130 may be a multi-focal plane display in which two or more transparent displays are stacked. On the focal plane panels 1101, layer color images of different reference layers may be displayed. Thus, on the respective focal plane panels 1101 of the display device 1100, overlapping layer color patterns of reference layers are not displayed, but separate layer color patterns are displayed for the respective focal plane panels 1101. In particular, a multi-layer mapping image to be displayed on each focal plane panels 1101 may be separately generated, but from a point of view of a user, the user may watch what appears as a 3D image 1110 of one scene. The multi-layer mapping image to be displayed on each focal plane panel 1101 may be generated by using original color data of reference layers and adjustment color data mapped to reference layers.

FIG. 12 is a flowchart of a method for processing a 3D image, according to an exemplary embodiment. Referring to FIG. 12, the method for processing a 3D image includes operations processed in time series by the computing device 10 (i.e., the processor 120) described above. Thus, a description provided above with reference to the drawings may be applied to the method for processing a 3D image shown in FIG. 12, though being omitted.

In operation 1210, the layer mapper 121 of the processor 120 receives original color data and original depth data of each of a plurality of layers of an original holographic image.

In operation 1220, the layer mapper 121 of the processor 120 selects one or more reference layers from among the plurality of layers.

In operation 1230, the layer mapper 121 of the processor 120 maps adjustment color data of a non-selected layer, which is calculated by using original depth data of the non-selected layer and the reference layers, to each reference layer.

In operation 1240, the CGH image generator 124 of the processor 120 generates the CGH image by using original color data of the reference layers and the adjustment color data mapped to the reference layers.

Meanwhile, at least some of the foregoing exemplary embodiments may be written as programs executable on computers, and may be implemented on general-purpose digital computers operating the programs by using a transitory or non-transitory computer-readable recording medium. A structure of data used in the foregoing exemplary embodiments may be recorded on a transitory or non-transitory computer-readable recording medium using various means. The non-transitory computer-readable recording medium may include a storage medium such as a magnetic storage medium (e.g., read-only memory (ROM), floppy disks, hard disks, etc.), an optical recording medium (e.g., compact disk (CD)-ROMs, digital versatile disks (DVDs), etc.), and/or any other suitable medium.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method for processing a three-dimensional image, the method comprising:
    receiving original color data and original depth data of each of a plurality of layers with respect to an original holographic image;
    selecting at least one reference layer from among the plurality of layers;
    mapping adjustment color data of a non-selected layer, which is determined based on the original depth data of the non-selected layer and the at least one reference layer, to each of the at least one reference layer; and
    generating a computer generated hologram (CGH) image based on the original color data of the at least one reference layer and the mapped adjustment color data,
    wherein the mapping the adjustment color data comprises determining respective adjustment color values of pixels included in the non-selected layer in correspondence with each of the at least one reference layer by applying a respective weight value that corresponds to each respective distance between the non-selected layer and each of the at least one reference layer, to original color values of the pixels included in the non-selected layer, and mapping the determined adjustment color values of the pixels to each of the at least one reference layer, and
    wherein each respective weight value is set in inverse proportion to a difference between a respective depth of a corresponding pixel included in the non-selected layer and a depth of the at least one reference layer.

2. The method of claim 1, wherein the selecting the at least one reference layer comprises selecting at least three reference layers from among the plurality of layers such that an interval between a first reference layer and a second reference layer is equal to an interval between the second reference layer and a third reference layer.

3. The method of claim 1, wherein the selecting the at least one reference layer comprises selecting the at least one reference layer from among the plurality of layers such that a respective interval between adjacent ones of the at least one reference layer narrows as a corresponding distance of the at least one reference layer to a viewpoint of a user is reduced.

4. The method of claim 1, wherein the mapping the adjustment color data comprises mapping the adjustment color data to each of the at least one reference layer.

5. The method of claim 1, wherein the mapping the adjustment color data comprises mapping the adjustment color data to two reference layers that are adjacent to the non-selected layer.

6. The method of claim 1, wherein the generating the CGH image comprises:
    performing, for each of the at least one reference layer, a respective frequency transformation with respect to the original color data of the corresponding at least one reference layer and the adjustment color data mapped to the corresponding at least one reference layer;
    encoding respective results of each respective frequency transformation into respective integer values; and
    generating the CGH image based on the integer values.

7. A non-transitory computer-readable recording medium having recorded thereon a program for executing the method of claim 1 on a computer.

8. An apparatus for processing a three-dimensional image, the apparatus comprising:
    a memory configured to store original color data and original depth data of each of a plurality of layers with respect to an original holographic image; and
    a processor configured:
        to receive the original color data and the original depth data from the memory,
        to select at least one reference layer from among the plurality of layers,
        to map adjustment color data of a non-selected layer, which is determined based on the original depth data of the non-selected layer and the at least one reference layer, to each of the at least one reference layer, and
        to generate a computer generated hologram (CGH) image based on the original color data of the at least one reference layer and the mapped adjustment color data,
    wherein the processor is further configured to determine respective adjustment color values of pixels included in the non-selected layer in correspondence with each of the at least one reference layer by applying a respective weight value that corresponds to each respective distance between the non-selected layer and each of the at least one reference layer, to original color values of the pixels included in the non-selected layer, and to map the determined adjustment color values of the pixels to each of the at least one reference layer, and
    wherein each respective weight value is set in inverse proportion to a difference between a respective depth of a corresponding pixel included in the non-selected layer and a depth of the at least one reference layer.

9. The apparatus of claim 8, wherein the processor is further configured to select at least three reference layers from among the plurality of layers such that an interval between a first reference layer and a second reference layer is equal to an interval between the second reference layer and a third reference layer.

10. The apparatus of claim 8, wherein the processor is further configured to select the at least one reference layer from among the plurality of layers such that a respective interval between adjacent ones of the at least one reference layer narrows as a corresponding distance of the at least one reference layer to a viewpoint of a user is reduced.

11. The apparatus of claim 8, wherein the processor is further configured to map the adjustment color data to each of the at least one reference layer.

12. The apparatus of claim 8, wherein the processor is further configured to map the adjustment color data to two reference layers that are adjacent to the non-selected layer.

13. The apparatus of claim 8, wherein the processor is further configured:
    to perform, for each of the at least one reference layer, a respective frequency transformation with respect to the original color data of the corresponding at least one reference layer and the adjustment color data mapped to the corresponding at least one reference layer,
    to encode respective results of each respective frequency transformation into respective integer values, and
    to generate the CGH image based on the integer values.

14. The apparatus of claim 8, wherein the processor is further configured:

to separately generate a multi-layer mapping image to be displayed on each of at least two panels for a display on which the at least two panels are stacked and images are formed at spatially different locations, and
the multi-layer mapping image is generated based on the original color data of the at least one reference layer and the mapped adjustment color data.

\* \* \* \* \*